United States Patent [19]

Olschewski et al.

[11] 4,374,556
[45] Feb. 22, 1983

[54] CLUTCH RELEASE DEVICE

[75] Inventors: Armin Olschewski, Schweinfurt; Manfred Brandenstein, Eussenheim; Lothar Walter, Schweinfurt; Horst M. Ernst, Eltingshausen, all of Fed. Rep. of Germany

[73] Assignee: SKF Kugellagerfabriken GmbH, Schweinfurt, Fed. Rep. of Germany

[21] Appl. No.: 204,185

[22] Filed: Nov. 5, 1980

[30] Foreign Application Priority Data

Nov. 8, 1979 [DE] Fed. Rep. of Germany ....... 7931492

[51] Int. Cl.³ .............................................. F16D 23/14
[52] U.S. Cl. .................................. 192/98; 192/30 V; 192/110 B
[58] Field of Search ................... 192/98, 110 B, 30 V; 308/233

[56] References Cited

U.S. PATENT DOCUMENTS

| | | | |
|---|---|---|---|
| 3,913,714 | 10/1975 | Camp | 192/98 X |
| 4,013,327 | 3/1977 | Kunkel et al. | 192/98 X |
| 4,026,398 | 5/1977 | Matyschik et al. | 192/98 |
| 4,094,394 | 6/1978 | Köder et al. | 192/98 |
| 4,306,641 | 12/1981 | Olshewski et al. | 192/98 |

*Primary Examiner*—Rodney H. Bonck
*Attorney, Agent, or Firm*—Daniel M. Rosen

[57] ABSTRACT

In a clutch release bearing assembly for a motor vehicle, the outer ring of a clutch thrust bearing has a flange engaging a radially extending flange of a housing part affixed to a sliding sleeve. This engagement permits play. An elastic ring is held fixed with respect to the outer bearing ring, and has projections extending axially from its internal circumference to engage circular surfaces of recesses of the housing. The circular surfaces of the recesses are joined by straight sections on the housing, whereby the tendency of the sliding sleeve to rotate with respect to the bearing ring effects the radial bending of the tongues, to damp such movement.

11 Claims, 4 Drawing Figures

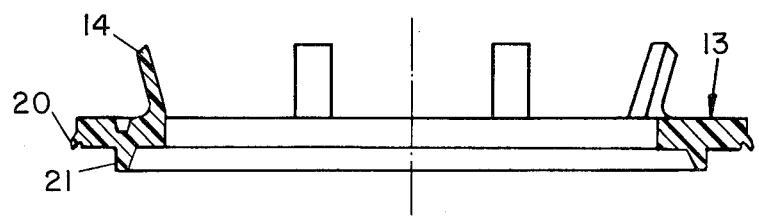
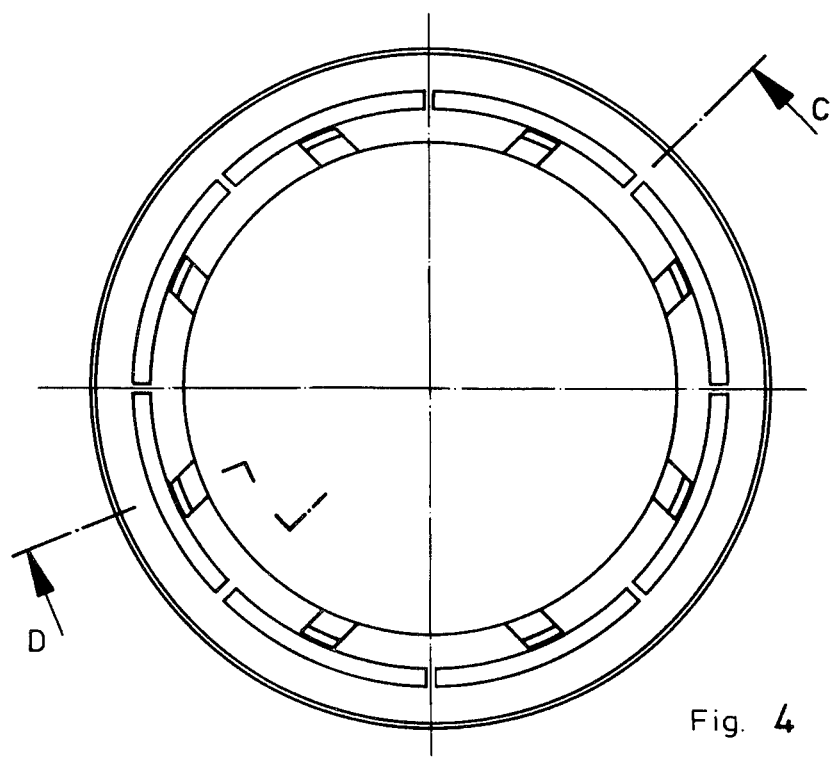

CLUTCH RELEASE DEVICE

This invention relates to a coupling release device especially for motor vehicle clutches, in which the clutch thrust bearing is mounted to be radially movable in or on a sliding sleeve, and in which the relative movement of the clutch thrust bearing is damped with respect to the sliding sleeve or the like.

A clutch thrust bearing is already known, in which a damping ring is provided in the boring of the fixed bearing ring, and which is provided with formed elastic elements in order to damp the relative movement of the clutch thrust bearing with respect to the sliding sleeve or the like. This known damping ring, however, requires a relatively large space in the bearing for its use.

The provision of a damping ring arranged to lay against a fixed bearing ring is also known wherein the damping ring has damping projections which extend through recesses of the fixed bearing ring and into recesses of the pressure plate. In this known arrangement, however, the pressure plate must have a complicated shape.

Briefly stated, in accordance with the invention, the above problems are overcome by providing a clutch release device, especially for motor vehicles, in which the damping ring provides a minimum of space, and no additional forming of the housing parts or the like is required. The release device of the clutch is supported on the fixed bearing ring, and provides smooth damping in the radial and circumferential directions, by the same means.

In further advantageous embodiments of the invention, the recesses of the pressure plate, into which resilient tongues of the damping ring extend, have circular surfaces and are joined to adjacent recesses by flat surfaces. Further, two tongues from the damping ring extend into each of the recesses of the pressure plate, to be normally at the ends of the respective circular surfaces.

In a still further arrangement in accordance with the invention, an annular projection on the outer circumference of the damping ring serves as a seal for a lubricating medium within the bearing, and an annular axially extending ridge may be provided on the side of the damping ring toward the fixed bearing ring, to direct the lubricating medium within the bearing.

BRIEF FIGURE DESCRIPTION

In order that the invention will be more clearly understood, it will now be disclosed in greater detail with reference to the accompanying drawings, wherein:

FIG. 3 is a cross-sectional view of the damping ring of the invention, taken along the lines C-D of FIG. 4; and FIG. 4 is a side view of the damping ring of FIG. 3.

DETAILED DISCLOSURE OF THE INVENTION

Figure 1:
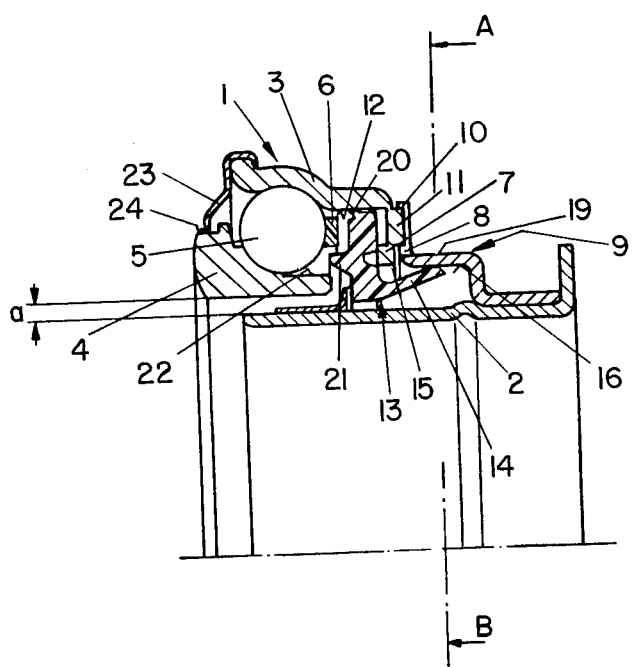
FIG. 1 is a longitudinal cross-section of a clutch release in accordance with the invention, on one side of the longitudinal axis thereof.
Figure 2:
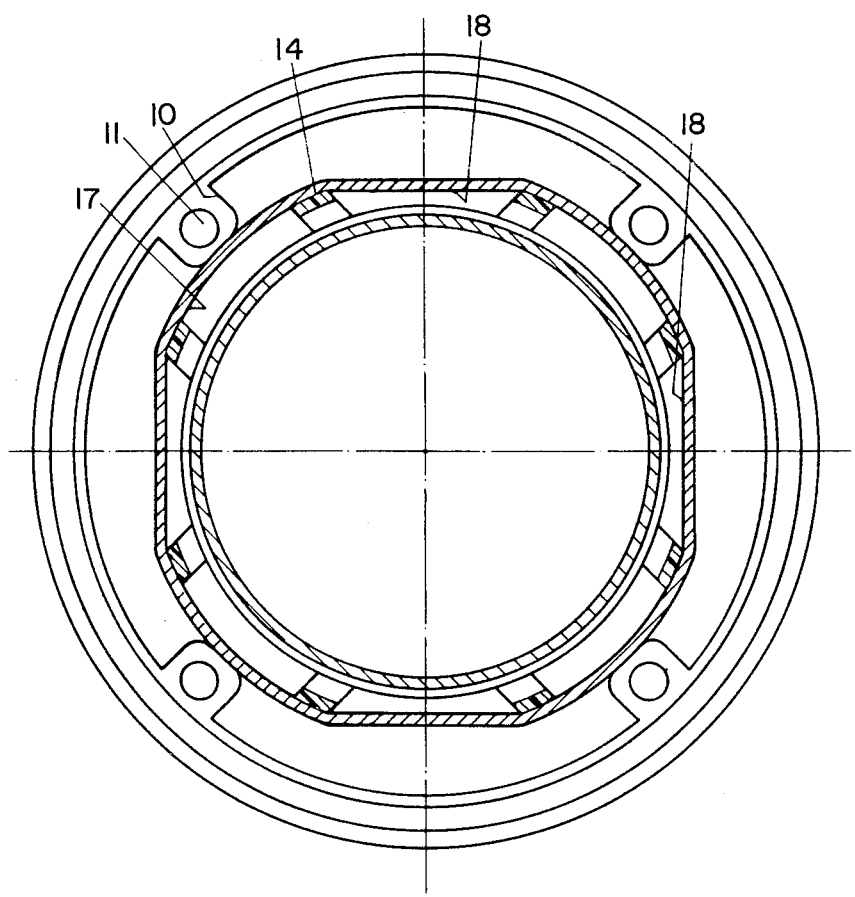
FIG. 2 is a cross-sectional view of the clutch release device of FIG. 1, taken along the lines A-B, and showing the bearing on both sides of the longitudinal axis thereof.

FIGS. 1 and 2 show a clutch release arrangement with a self-centering clutch thrust bearing 1. The clutch thrust bearing 1 is mounted to have radial play on a sliding sleeve 2. The clutch thrust bearing 1 is comprised of a sheet metal outer ring 3, a relatively thick inner ring 4, and balls 5. The balls 5 are held in a plastic cage 6, and run in the races formed by the inner and outer rings. The outer ring 3 is provided with an inwardly directed flange 7 which abuts or engages a radially outwardly angled section 8 of a housing part 9. The housing part 9 is press-fit on the sliding sleeve 2.

The outwardly angled section 8 of the housing part 9 has several recesses 10 distributed about its circumference, and axially extending projections 11 of the outer ring 3 engage these recesses, with play. The projections 11 serve as end stops to limit radial movement of the clutch thrust bearing 1. A damping ring 13 is arranged in the bore 12 of the outer ring 3. This damping ring is shown separately in FIGS. 3 and 4.

The damping ring 13 is provided with substantially axially directed resilient tongues 14 formed thereon. Each of these tongues 14 project in the axial direction through a recess 15 in the flange 7 of the outer ring, and abut the side surfaces of the recesses 15 to inhibit turning of the damping ring 3 with respect to the outer ring. The housing part 9 has a plurality of recesses 16 in the region of its bore and on the end thereof toward the inner ring 4, and the tongues 14 of the damping ring 13 extend axially into these recesses 16. Two of the tongues 14 extend into each of the recesses 16. The radial outer surface 17 of each recess 16 is circular, and each circumferential edge thereof joins a flat surface 18 extending between the recesses 16. Consequently, in the illustrated embodiment of the invention, two flat surfaces 18 extend parallel to one another, and are in planes at right angles to another pair thereof. The outer form of the section 19 of the housing part, although not shown, thus has four sides.

In operation, as long as the outer ring of the clutch thrust bearing 1 is not required to turn, the resilient tongues 14 engage the circular shaped surfaces 17 of the recesses 16 preferably at opposite ends thereof, as illustrated. Upon the release of the clutch, the outer ring 3 turns against the housing part 9, whereby at least some of the resilient fingers 14 are moved to engage the flat surfaces 18 of the arrangement, and are consequently forced radially inwardly. Consequently, the movement of the outer ring 3 in the circumferential direction is damped. The damping of the radial bearing movement, for example in strong road shocks, extends also through the resilient tongues 14, so that the balls 5 and races of the bearing rings 3, 4 are protected against damage.

The damping ring 13 is provided with a lip 20 extending around its outer surface, the lip having an outer diameter which, in the unassembled condition of the bearing, is larger than the diameter of the bore 12 in the outer ring 3. As a consequence, when the bearing is asembled, the lip 20 is bent downwardly so that it lays with pre-stress on the boring surface 12 of the outer ring 3. As a consequence, the escape of lubricating means from the space between the outer ring 3 and the damping ring 13 is inhibited.

The damping ring 13, on the side toward the rolling bodies 5, has an axially directed circumferentially extending projection 21, which extends to the vicinity of the adjacent surface 22 of inner ring 4. The projection 21 is so formed, that lubricating means moving away from the space a through the rotating inner ring 4 and advancing in the bearing due to the centrifugal force of the rotating ring 4, is held within the bearing. The clutch thrust bearing 1 is sealed on the side toward the clutch by a sheet metal cap 23, which engages an annular recess 24 on the surface of the inner ring.

The above described arrangement constitutes only one example of the clutch thrust bearing of the invention. Other constructions of the individual components are contemplated within the scope of the invention. For example only, the projection 21 on the damping ring 13 may be in the form of a separate element, or it may be provided on the outer ring 3.

What is claimed is:

1. In a clutch release bearing assembly, in which a clutch thrust bearing is mounted to be radially displaceable with respect to sliding sleeve means and has a fixed bearing ring and a rotatable bearing ring, housing means coupled to the sliding sleeve has a radially directed flange that engages said fixed bearing ring of said clutch thrust bearing, said fixed bearing ring having a bore, and a ring of elastic material is positioned in the bore or on the surface of the fixed bearing ring, the ring of elastic material constituting means for damping the relative movement of the clutch thrust bearing with respect to the sliding sleeve; the improvement wherein said housing means has a bore with axially directed open recesses facing said clutch thrust bearing, said damping ring having resilient tongues extending substantially axially from its inner circumference, said resilient tongues engaging said recesses of said housing means, the outer radial surface of each said recess having a circular shape, and being joined at its circumferential ends to a flat surface extending between adjacent recesses.

2. The clutch release bearing of claim 1, wherein two resilient tongues from the damping ring project in the axial direction into each said recess through recess means in the flange of said fixed bearing ring, said tongues abutting surfaces of the recess means.

3. The clutch release device of claim 1, wherein said damping ring has an axially directed annular projection on the side thereof toward the clutch thrust bearing, said annular projection extending up to the vicinity of the rotatable ring of the clutch thrust bearing.

4. In a clutch release bearing assembly wherein the fixed bearing ring of a clutch thrust bearing has a flange, flange means coupled to a sliding sleeve, said flange axially engaging with play said flange means, and a ring of elastic material is mounted to damp relative movement between the sliding sleeve and the fixed bearing ring; the improvement wherein said flange means has recesses on the end thereof facing said fixed ring, said recesses having radial surfaces that are circular, the circumferential end of the circular surfaces of each recess joining a non-circular surface that joins the next adjacent recess, and said elastic ring is held with respect to said fixed ring and has tongue means extending axially to abut said circular surfaces.

5. The clutch release bearing assembly of claim 4, wherein said flange means comprises a housing part radially outward of said sliding sleeve, whereby said recess extends between said housing part and said sliding sleeve and said circular surfaces of said recesses are radially outwardly of said recesses, said non-circular surfaces comprising straight surfaces.

6. The clutch release bearing assembly of claim 5, wherein two of said tongue means extend into each of said recesses, and, in the absence of rotational forces on said bearing assembly, said tongue means engage opposite circumferential ends of each respective circular surfaces.

7. The clutch release bearing assembly of claim 6, wherein said tongue means extend into said recesses by way of recess means in said flange of said fixed bearing ring, the circumferential sides of said tongue means engaging said recess means of said flange to inhibit relative rotational movement between said elastic ring and said fixed bearing ring.

8. The clutch release bearing assembly of claim 4, wherein said flange has axially extending projections extending into recesses of said flange means having dimensions to enable relative play between said fixed bearing ring and sliding sleeve.

9. The clutch release bearing assembly of claim 4 wherein said non-circular surface extends radially inwardly from each junction with a circular surface, whereby said tongue means are urged radially inwardly upon relative circumferential displacement between said sliding sleeve and fixed bearing ring.

10. The clutch release bearing assembly of claim 9 wherein said non-circular surface is a flat surface.

11. The clutch release bearing assembly of claim 9 wherein said tongue means abutting each said circular surface comprises a pair of tongues positioned to abut respective opposite circumferential ends of the circular surface.

* * * * *